United States Patent [19]
Tai

[11] Patent Number: 5,239,390
[45] Date of Patent: Aug. 24, 1993

[54] IMAGE PROCESSING METHOD TO REMOVE HALFTONE SCREENS

[75] Inventor: Hwai-Tzuu Tai, Rochester, N.Y.

[73] Assignee: Eastman Kodak Company, Rochester, N.Y.

[21] Appl. No.: 895,986

[22] Filed: Jun. 5, 1992

[51] Int. Cl.$^5$ .............................................. H04N 1/387
[52] U.S. Cl. .................................... 358/458; 358/298
[58] Field of Search ............... 358/298, 455, 456, 458, 358/459, 462, 464, 447, 463; 382/42, 43

[56] References Cited

U.S. PATENT DOCUMENTS

| | | | |
|---|---|---|---|
| 4,194,221 | 3/1980 | Stoffel | 358/456 |
| 4,403,257 | 9/1983 | Hsieh | 358/462 |
| 4,907,096 | 3/1990 | Stansfield | 358/456 |
| 4,941,190 | 7/1990 | Joyce | 358/464 |

Primary Examiner—Edward L. Coles, Sr.
Assistant Examiner—Scott A. Rogers
Attorney, Agent, or Firm—Norman Rushefsky

[57] ABSTRACT

A method and arrangement for reproducing an original image scans an original image to produce a digitzed image, performs a local structure analysis of the digitized image, and selectively applies a descreening filter to a region of the digitized image based on the results of the local structure analysis to remove a specific frequency of the digitized image caused by halftone screens. The descreening filter bypasses regions of the digitized image such that these bypassed regions remain unfiltered. The filtered regions and the bypassed regions are printed as a single, unified reproduction of the original image. This removes halftone screens from the image while maintaining the contrast of text.

10 Claims, 10 Drawing Sheets

| LEVEL 1 | | | | LEVEL 5 | | | |
|---|---|---|---|---|---|---|---|
| 43 | 36 | 22 | 8 | 47 | 40 | 26 | 12 |
| 15 | ① | 29 | 50 | 19 | 5 | 33 | 54 |
| 22 | 8 | 43 | 36 | 26 | 12 | 47 | 40 |
| 29 | 50 | 15 | 1 | 33 | 54 | 19 | 5 |

| LEVEL 2 | | | | LEVEL 6 | | | |
|---|---|---|---|---|---|---|---|
| 44 | 37 | 23 | 9 | 48 | 41 | 27 | 13 |
| 16 | 2 | 30 | 51 | 20 | 6 | 34 | 55 |
| 23 | 9 | 44 | 37 | 27 | 13 | 48 | 41 |
| 30 | 51 | 16 | 2 | 34 | 55 | 20 | 6 |

| LEVEL 3 | | | | LEVEL 7 | | | |
|---|---|---|---|---|---|---|---|
| 45 | 38 | 24 | 10 | 49 | 42 | 28 | 14 |
| 17 | 3 | 31 | 52 | 21 | 7 | 35 | 56 |
| 24 | 10 | 45 | 38 | 28 | 14 | 49 | 42 |
| 31 | 52 | 17 | 3 | 35 | 56 | 21 | 7 |

| LEVEL 4 | | | |
|---|---|---|---|
| 46 | 39 | 25 | 11 |
| 18 | 4 | 32 | 53 |
| 25 | 11 | 46 | 39 |
| 32 | 53 | 18 | 4 |

| | LEVEL 1 | | | | LEVEL 5 | | |
|---|---|---|---|---|---|---|---|
| 7 | 6 | 4 | 2 | 39 | 38 | 36 | 34 |
| 3 | ① | 5 | 8 | 35 | 33 | 37 | 40 |
| 4 | 2 | 7 | 6 | 36 | 34 | 39 | 38 |
| 5 | 8 | 3 | 1 | 37 | 40 | 35 | 33 |

34 points to LEVEL 1.

| | LEVEL 2 | | | | LEVEL 6 | | |
|---|---|---|---|---|---|---|---|
| 15 | 14 | 12 | 10 | 47 | 46 | 44 | 42 |
| [11] | 9 | [13] | 16 | 43 | 41 | 45 | 48 |
| [12] | [10] | 15 | 14 | 44 | 42 | 47 | 46 |
| 13 | 16 | 11 | 9 | 45 | 48 | 43 | 41 |

| | LEVEL 3 | | | | LEVEL 7 | | |
|---|---|---|---|---|---|---|---|
| 23 | 22 | 20 | 18 | 55 | 54 | 52 | 50 |
| 19 | 17 | 21 | 24 | 51 | 49 | 53 | 56 |
| 20 | 18 | 23 | 22 | 52 | 50 | 55 | 54 |
| 21 | 24 | 19 | 17 | 53 | 56 | 51 | 49 |

| | LEVEL 4 | | |
|---|---|---|---|
| 31 | 30 | 28 | 26 |
| 27 | 25 | 29 | 32 |
| 28 | 26 | 31 | 30 |
| 29 | 32 | 27 | 25 |

FIG. 6

| LEVEL 1 | | | | LEVEL 5 | | | |
|---|---|---|---|---|---|---|---|
| 31 | 26 | 16 | 6 | 35 | 30 | 20 | 10 |
| 11 | ① | 21 | 36 | 15 | 5 | 25 | 40 |
| 16 | [6] | 31 | 26 | 20 | 10 | 35 | 30 |
| 21 | 36 | 11 | 1 | 25 | 40 | 15 | 5 |

| LEVEL 2 | | | | LEVEL 6 | | | |
|---|---|---|---|---|---|---|---|
| 32 | 27 | 17 | 7 | 47 | 46 | 44 | 42 |
| 12 | 2 | 22 | 37 | 43 | 41 | 45 | 48 |
| 17 | 7 | 32 | 27 | 44 | 42 | 47 | 46 |
| 22 | 37 | 12 | 2 | 45 | 48 | 43 | 41 |

| LEVEL 3 | | | | LEVEL 7 | | | |
|---|---|---|---|---|---|---|---|
| 33 | 28 | 18 | 8 | 55 | 54 | 52 | 50 |
| 13 | 3 | 23 | 38 | 51 | 49 | 53 | 56 |
| 18 | 8 | 33 | 28 | 52 | 50 | 55 | 54 |
| 23 | 38 | 13 | 3 | 53 | 56 | 51 | 49 |

| LEVEL 4 | | | |
|---|---|---|---|
| 34 | 29 | 19 | 9 |
| 14 | 4 | 24 | 39 |
| 19 | 9 | 34 | 29 |
| 24 | 39 | 14 | 4 |

FIG. 7

| THRESHOLD LEVEL 1 | | | | THRESHOLD LEVEL 6 | | | | THRESHOLD LEVEL 11 | | | |
|---|---|---|---|---|---|---|---|---|---|---|---|
| 56 | 67 | 34 | 12 | 61 | 72 | 39 | 17 | 66 | 77 | 44 | 22 |
| 23 | 1 | 45 | 78 | 28 | 6 | 50 | 83 | 33 | 11 | 55 | 88 |
| 34 | 12 | 56 | 67 | 39 | 17 | 61 | 72 | 44 | 22 | 66 | 77 |
| 45 | 78 | 23 | 1 | 50 | 83 | 28 | 6 | 55 | 88 | 33 | 11 |

| THRESHOLD LEVEL 2 | | | | THRESHOLD LEVEL 7 | | | | THRESHOLD LEVEL 12 | | | |
|---|---|---|---|---|---|---|---|---|---|---|---|
| 57 | 68 | 35 | 13 | 62 | 73 | 40 | 18 | 94 | 95 | 92 | 90 |
| 24 | 2 | 46 | 79 | 29 | 7 | 51 | 84 | 91 | 89 | 93 | 96 |
| 35 | 13 | 57 | 68 | 40 | 18 | 62 | 73 | 92 | 90 | 94 | 95 |
| 46 | 79 | 24 | 2 | 51 | 84 | 29 | 7 | 93 | 96 | 91 | 89 |

| THRESHOLD LEVEL 3 | | | | THRESHOLD LEVEL 8 | | | | THRESHOLD LEVEL 13 | | | |
|---|---|---|---|---|---|---|---|---|---|---|---|
| 58 | 69 | 36 | 14 | 63 | 74 | 41 | 19 | 102 | 103 | 100 | 98 |
| 25 | 3 | 47 | 80 | 30 | 8 | 52 | 85 | 99 | 97 | 101 | 104 |
| 36 | 14 | 58 | 69 | 41 | 19 | 63 | 74 | 100 | 98 | 102 | 103 |
| 47 | 80 | 25 | 3 | 52 | 85 | 30 | 8 | 101 | 104 | 99 | 97 |

| THRESHOLD LEVEL 4 | | | | THRESHOLD LEVEL 9 | | | | THRESHOLD LEVEL 14 | | | |
|---|---|---|---|---|---|---|---|---|---|---|---|
| 59 | 70 | 37 | 15 | 64 | 75 | 42 | 20 | 110 | 111 | 108 | 106 |
| 26 | 4 | 48 | 81 | 31 | 9 | 53 | 86 | 107 | 105 | 109 | 112 |
| 37 | 15 | 59 | 70 | 42 | 20 | 64 | 75 | 108 | 106 | 110 | 111 |
| 48 | 81 | 26 | 4 | 53 | 86 | 31 | 9 | 109 | 112 | 107 | 105 |

| THRESHOLD LEVEL 5 | | | | THRESHOLD LEVEL 10 | | | | THRESHOLD LEVEL 15 | | | |
|---|---|---|---|---|---|---|---|---|---|---|---|
| 60 | 71 | 38 | 16 | 65 | 76 | 43 | 21 | 118 | 119 | 116 | 114 |
| 27 | 5 | 49 | 82 | 32 | 10 | 54 | 87 | 115 | 113 | 117 | 120 |
| 38 | 16 | 60 | 71 | 43 | 21 | 65 | 76 | 116 | 114 | 118 | 119 |
| 49 | 82 | 27 | 5 | 54 | 87 | 32 | 10 | 117 | 120 | 115 | 113 |

FIG. 8

IMAGE PROCESSING METHOD TO REMOVE HALFTONE SCREENS

This invention is related to the following applications, filed on even date with the present application: Ser. No. 07/894,858, for Classification to Change Exposure Within a Cell of Different Pixels; Ser. No. 07/894,857, for Halftone Dot Arrangement in Gray Level Halftone Printing; Ser. No. 07/894,8595, for A Method and Arrangement For Providing a Default Mode in Digital Copying; Ser. No. 07/895,555, for A Method and Arrangement For Locally Switching Gray Dot Types to Reproduce an Image With Gray Level Printing; Ser. No. 07/895,985, for Multi-Bit Rendering Method and Arrangement for Continuous Tone Picture Representation and Printing; Ser. No. 07/895,554, for A Method and Apparatus For Imbedding Controlled Structure For Gray Scale Rendering; and Ser. No. 07/895,988, for Line Screen Design for Gray Scale Rendering. Each of these related applications is hereby expressly incorporated by reference into this application.

FIELD OF THE INVENTION

The present invention relates to the field of encoding pictorial imagery for reproduction on display or printing systems, and more particularly, to method and apparatus for removing halftone screens while maintaining the contrast of text in a digital image reproduction environment.

BACKGROUND OF THE INVENTION

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one picture element of the recording or display surface consists of a j×k matrix of sub-elements where j and k are positive integers. A halftone image is reproduced by printing the respective sub-elements or leaving them blank, in other words, by suitably distributing the printed marks.

Halftone image processing algorithms are evaluated in part, by their capability of delivering a complete gray scale at normal viewing distances. The capability of a particular process to reproduce high frequency rendition (fine detail) with high contrast modulation makes that procedure superior to one which reproduces such fine detail with lesser or no output contrast.

Another method of producing gray levels is provided by gray level printing. In such a method, each pixel has the capability to render several different dot sizes. The dot size for a pixel is a function of the exposure time provided an LED element corresponding to that pixel. The longer the exposure time, the more toner is attracted to that particular pixel. See, for example, U.S. Pat. No. 4,680,645 for a method of rendering gray scale images with variable dot sizes.

There are two major concerns in rendering a continuous tone image for printing: (1) the resolution of image details, and (2) the reproduction of gray scales in a binary halftone representation scheme, these two fundamental factors compete with each other. The more gray levels that are rendered, the larger is the halftone cell. Consequently, coarse halftone line screens are provided, with the attendant poor image appearance. Hence, a compromise is made in rendering between the selection of line resolution and gray scales in binary halftone printing. However, in gray level halftone printing, one can satisfy both resolution and gray level requirements. In gray level printing, the same number of addressable dots are present, and there is a choice of dot sizes from one dot-size of 1 bit/pixel to 16 different dot-sizes of 4 bit/pixel. An image could then be rendered with 133 line screens and 128 gray scales of higher quality image. Although providing higher image quality with respect to line resolution and tonal scales, gray level halftoning presents its own dot rendering issues.

A problem exists in the application of a gray level rendering technique to a document that contains different types of images: text, halftone, and continuous tone. These different types of images create different rendering problems, based on a trade-off between tone scales and detail resolution. For example, with text, the number of tone scales is not as important as providing a smooth text edge, whereas the opposite holds true for continuous tone images. Providing a single type of gray level halftone rendering technique to a document that contains two or more types of images may lead to the production of a document in which one or more of the different types of images are reproduced unsatisfactorily.

When scanning a document, image processing techniques have been applied to convert a gray scale image into an image representation which a printer can accept (either binary format or gray level format). In this scanning process, text areas, line drawing and halftone pictures are indistinguishable from each other, and all appear to be a gray scale image. Improper conversion process create artifacts in the hardcopy such as a jagged boundary in the text area, or a Moire pattern in the halftone region. To overcome this, intelligent processes have been developed to segment the image into different regions of text, line drawing, and picture. Different conversion processes for the individual segments were then applied to these segments to restore the original document. However, these segmentation and conversion processes unduly complicate the digital copying process.

In the digital copier environment, a document is scanned into a digital pixel value and stored for later rendition process. The document may consist of different image types such as: text, halftone picture, and continuous tone picture. Each type has its own characteristics. All of them are needed to be rendered into 1-bit binary or multi-bit gray scale before printing. If all different types are treated the same in the rendition, a text may be screened and a halftone picture may be full of beating patterns (ie. Moire patterns). This results in a poor quality of print. Therefore, it would be preferred to remove screens with some sacrifices on the contrast of the text before rendering. It needs a special filter design to accomplish this goal.

SUMMARY OF THE INVENTION

This and other needs are met by the present invention which provides a method of reproducing an original image, comprising scanning an original image to produce a digitized image, performing a local structure analysis of the digitized image, and selectively applying a descreening filter to a region of the digitized image based on the results of the local structure analysis to remove a specific frequency of the digitized image caused by halftone screens. The descreening filter bypasses regions of the digitized image such that these bypassed regions remain unfiltered. The filtered regions and the bypassed regions are printed as a single, unified reproduction of the original image.

In certain embodiments of the invention, the step of performing the local structure analysis includes the steps of establishing a moving window for the digitized image around a central pixel, determining if the moving window is a low contrast window or a high contrast window, determining if there is a consistent transition in the moving window around the central pixel, and causing the application of the descreening filter to the moving window when the moving window is a high contrast window and there is not a consistent transition in the moving window around the central pixel.

The earlier stated needs are also achieved by another embodiment of the invention which provides an arrangement for reproducing an original image, comprising a scanner which scans and digitizes the original image, and a controller coupled to the scanner to receive the digitized original image. The controller performs a local structure analysis of the digitized original image, selectively applies a descreening filter to a region of the digitized original image based on the results of the local structure analysis to remove a specific frequency of the digitized image caused by halftone screens, bypasses the descreening filter with regions of the digitized image such that these bypassed regions remain unfiltered, and produces a first signal containing filtered regions and unfiltered regions, this first signal corresponding to the digitized original image. The arrangement includes a printer coupled to the controller to receive the first signal and produces a gray level halftoned reproduction of the original image.

The method and arrangement of the present invention, which selectively applies a descreening filter, removes halftone screens from images while maintaining the contrast of text when reproducing an original image.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary 3-bit gray halftone dot layout according to a full dot type embodiment of the present invention.

FIG. 6 shows a 3-bit gray halftone dot layout according to a partial dot type embodiment of the present invention.

FIG. 7 shows a 3-bit gray halftone dot layout according to a mixed dot type embodiment of the present invention.

FIG. 8 shows a 4-bit gray halftone dot layout according to a mixed dot type embodiment of the present invention.

DETAILED DESCRIPTION OF THE DRAWINGS

Figures 1, 2:
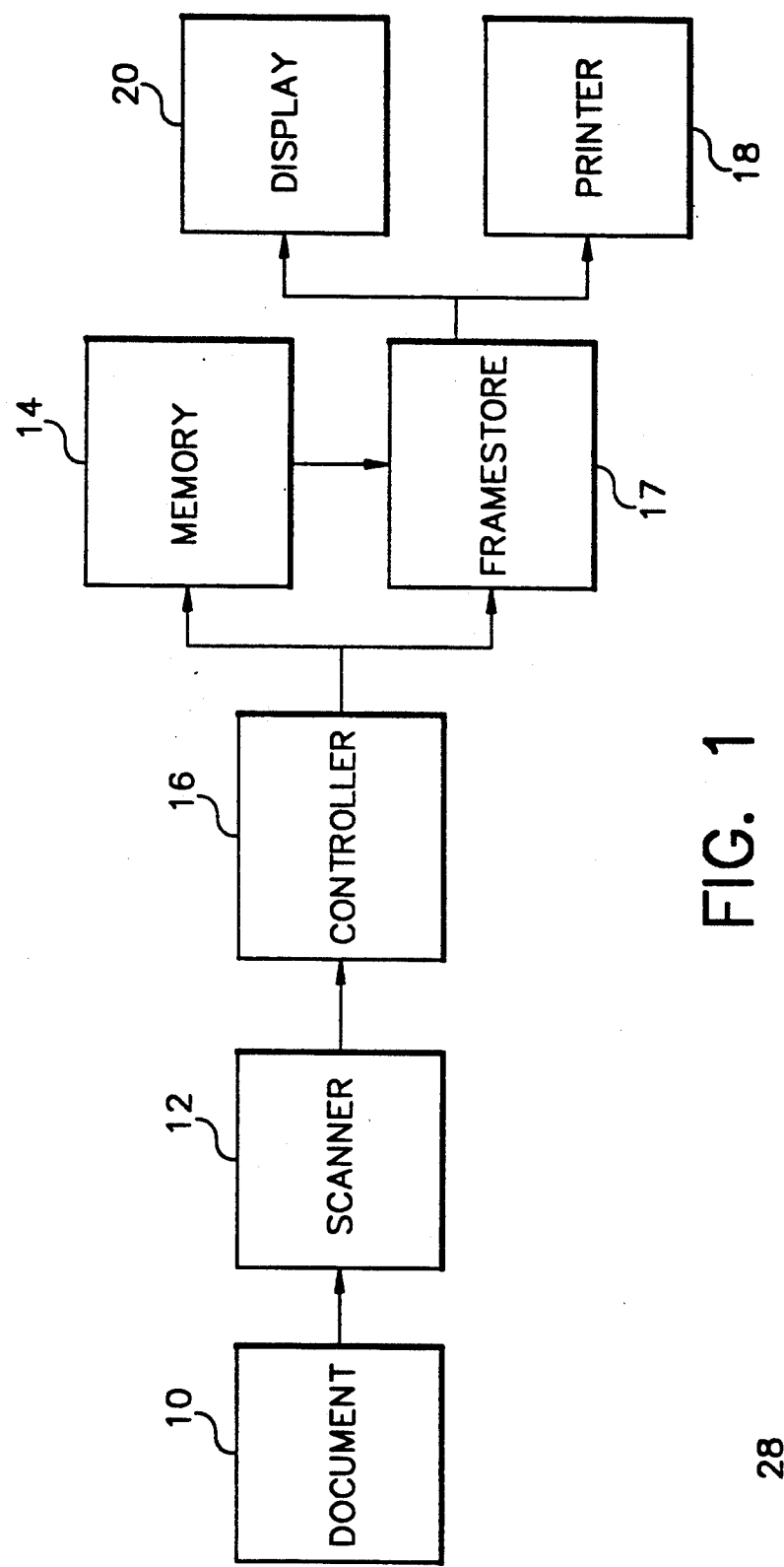
FIG. 1 shows a block diagram of an arrangement for reproducing an image, constructed in accordance with an embodiment of the present invention.
FIG. 2 shows an example of a 4×4 cell with indications of gray level for each pixel.

FIG. 1 illustrates an arrangement which reproduces a document. The document 10 can contain different types of images on the same document. For example, document 10 may contain both text and continuous tone areas, and may also contain halftone areas.

The document 10 is scanned in and digitized by a conventional scanner 12, which operates to provide digital signals representative of the densities of the areas of the document 10 corresponding to a pixel. These signals are sent to a memory (or buffer) 14. Under the direction of a controller 16, these signals may be modified and provided as gray level signals through a framestore 17 to a printer 18 and/or a display 20 for each pixel. The printer 18 and/or display 20 will then reproduce the document 10 by energizing each of the individual pixels according to the gray levels as modified (or not modified) by the controller 16. The memory 14, the controller 16, the framestore 17, the printer 18 and the display 20 are of conventional hardware design.

In gray level printing, each pixel has the capability to render several different dot sizes, and thus different gray levels. However, instead of simply providing each pixel with an independent gray level, several pixels may be organized together to form a superpixel, or cell. Each of the pixels in a cell is then provided with a gray level. The human visual response integrates the various gray levels of the individual pixels in the cell to a single perceived gray level for the cell. This is similar to the basic concept of binary halftoning. The number of tone scales for a cell is increased greatly, however, due to the number of different gray levels available for each pixel. For example, instead of only the two levels provided in binary halftoning for each pixel, eight levels can be provided with gray level printing for each pixel in a cell (3 bits/pixel). When the cell is made up of 4×4 pixels, for example, the gray level printing allows 121 different gray shades to be rendered for that cell. An example of a 4×4 cell 28 with numbers that represent gray levels for each pixel is shown in FIG. 2.

The formation of the dots in the pixels of a cell can be performed in a number of different manners to achieve different desired results. The dots can be formed as "full" dot, "partial" dot, or "mixed" dot to provide gray level halftoning.

FIG. 3 illustrates an example of a 3-bit gray halftone dot layout for a full dot type formation. Also illustrated are seven different pixel-dot sizes, corresponding to the sizes that each individual pixel-dot can obtain. There are 57 possible gray levels for the exemplary eight element cell 30 shown here. An example of the formation of a cell that is at gray level 12 will now be given.

The pixel circled in level 1, reference numeral 1, is formed to dot-size 1 in level 1. (Only one cell will be described, although the pixels of other cells will be changed according to the same layout, as shown in FIG. 3). The dot at this pixel grows larger and larger as the levels increase from level 1 to level 2 all the way to level 7. One can see that this circled pixel increases in value from 1 to 7 as the levels increase. If the desired gray level for the cell 30 was 7, then the formation of dots would be completed once the circled pixel has reached the dot-size of 7 in level 7. In this example, however, the gray level for the cell 30 is desired to be 12. At gray level 7, the circled pixel has reached its maximum dot-size, so that a dot at another pixel must now start forming. This dot starts forming at the pixel indicated with a square around it in level 1, with the numeral 8.

Figures 4, 5:
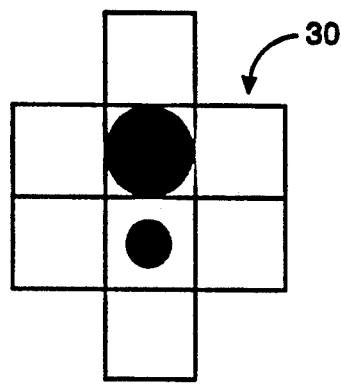
FIG. 4 shows a cell with dots that have been formed.
FIG. 5 illustrates an exemplary halftone dot mask.

The dot formation process continues, with the dot at this second pixel growing larger and larger as the levels again increase from level 1 to level 5. The formation process stops at level 5, since the pixel has now reached the value of 12. The halftone cell 30 now contains, as seen in FIG. 4, a dot of dot-size 7, and a dot of dot-size 5. The extension of this formation process to 57 gray levels is easy to see from this example.

The full dot type process thus involves forming dots at the highest priority pixels to their maximum allowable dot-size before beginning the formation of the dots at the next highest priority pixels. An exemplary halftone dot mask 32 with pixel priorities indicated is shown in FIG. 5. Different matrix sizes, cell shapes and priorities can be used for the cells than that illustrated in FIG. 3, without departing from the spirit and scope of the present invention.

In the electrophotographic process, the full dot type formation process is favored because it forms stable dots and exhibits less granularity (halftone printing noise). Another method which carries more information detail than full dot, but at the cost of less stable dots, is the partial dot type, described below.

A 3-bit gray halftone dot layout for the partial dot type formation process is shown in FIG. 6. In this process, the cell 34 is built by providing a dot of the same size to each pixel in the cell to the extent possible, before building up the dot at any particular pixel to the next larger size. Thus, for a gray level of 6 for the cell 34, the circled pixel in level 1 would have a dot formed at that pixel with a dot-size of 1. For larger gray levels, for example gray level 13, each of the pixels in the cell 34 would be built up to at least dot-size of 1. The pixels indicated with a square around them in level 2 would be built up to have a dot-size of 2.

The partial dot formation process can thus be seen to spread out the information over the cell, and therefore carries more information detail than the full dot. It does suffer from less stable dots and more granularity, however.

The mixed dot type, discussed below, combines the merits of both the full dot and the partial dot types in gray level halftoning. A number of different processes can be provided to combine the full dot type and the partial dot type, with the specific mixed dot type being chosen based on which renders an image with more smoothness, less graininess, and more image details. Suggested strategies are: 1) build small stable dots in the highlight (toe) region; 2) keep tone response linear in the mid-tone region; 3) reduce dot structure in the shadow (shoulder) region and render more details. Based on these considerations, a specific mixed dot type can be chosen by one of ordinary skill in the art to optimize stable dots, more image detail and less graininess.

An example of a specific mixed dot type 3-bit gray halftone dot layout is illustrated in FIG. 7. As can be seen, until gray level 41 is reached, the pixels are constrained from growing beyond dot-size of 5. The pixels grow in a full dot type process, with the pixel circled growing to a dot-size of 5, with the pixel that is squared then starting to grow in size. Once all of the pixels in the cell have attained a dot-size of 5, corresponding to gray level 40, the cell then increases in gray level by using a partial dot type process. In other words, each of the pixels in the cell must grow to a dot-size of 6 before any of the pixels begins growing to a dot-size of 7.

An example of a 4-bit gray halftone dot layout for mixed dot type is illustrated in FIG. 8. The formation of the dots is the same in concept to that illustrated in FIG. 7. Because there are 15 dot sizes available for each pixel, 121 gray levels for an eight element cell are obtainable.

Although any one of the three dot types could be used to produce a satisfactory continuous tone image, the mixed dot type is the best choice for continuous tone rendering. For scanned text and halftone, the full dot type creates a screen structure in the background of text and a Moire pattern in the halftone. The mixed dot type also creates a screen structure in the background of text and creates a Moire pattern in the halftone, though weaker than that created by the full dot type. By contrast, the partial dot renders well on both text and halftone.

The unified rendering technique used in the present invention uses both partial dot and mixed dot types according to local image content so that text, halftone and continuous tone images are all reproduced well.

Figure 12:
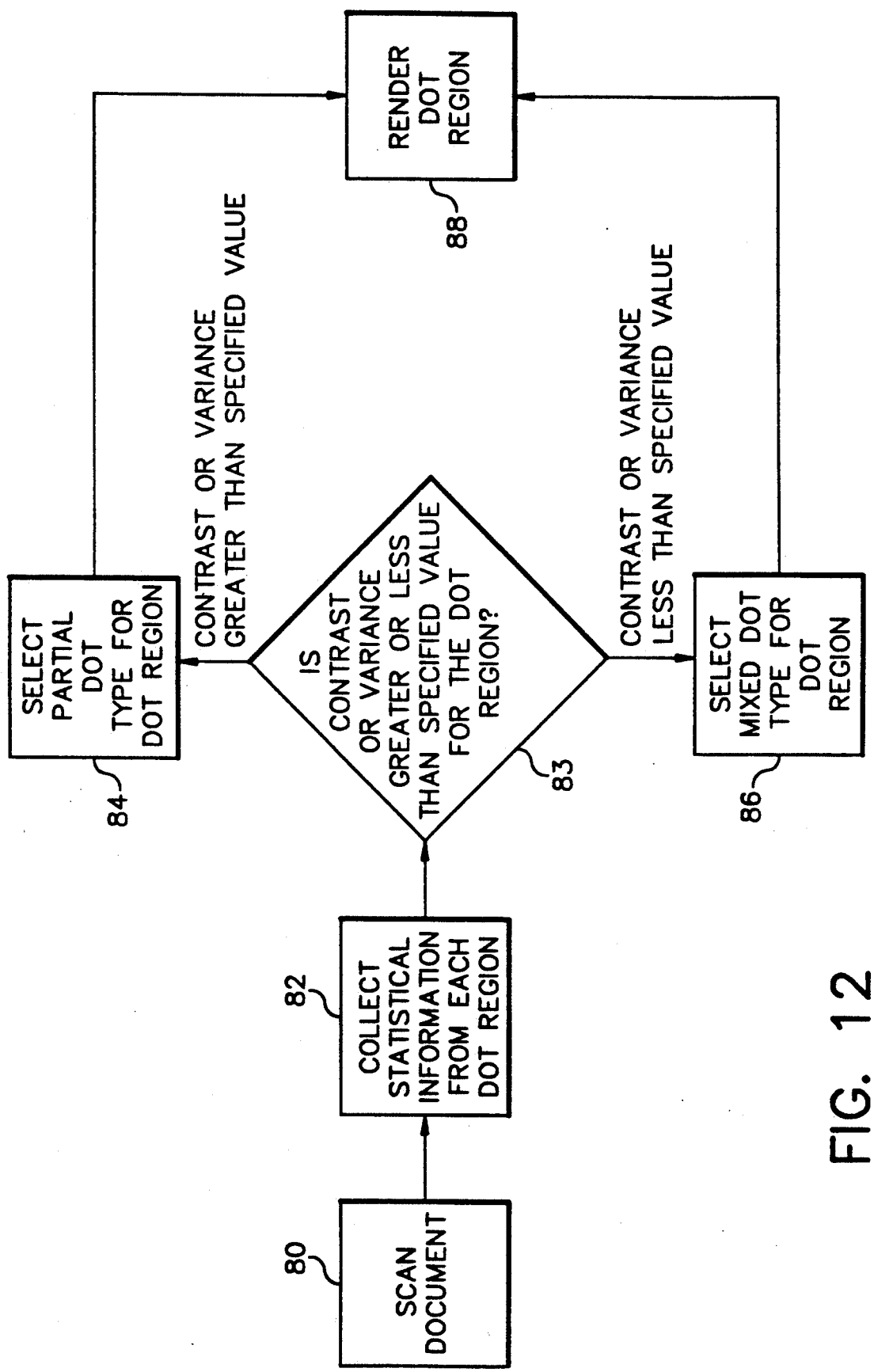
FIG. 12 is a flow chart of a unified rendering method that can be used in the present invention.

An exemplary embodiment of a method for unified image rendering is illustrated in FIG. 12. A document 10 is scanned in step 80, using the scanner 12 as shown in FIG. 1. The controller 16 collects statistical information from each dot region (e.g. 4×4 pixels) in step 82. This statistical information can include contrast, variance, variation or roughness, for example. The contrast is defined as the difference between local maximum intensity and local minimum intensity. The variation is defined as the average of the intensity difference between the nearest neighboring pixels. Techniques for finding the contrast or the variation are well known to those of ordinary skill in the art.

The present invention determines in step 83 whether the contrast or variance of a dot region is greater than a specified value. If the contrast or variance is greater than the value, a partial dot is selected for that dot region (step 84), otherwise, a mixed dot is selected (step 86). Finally, the image is reproduced by the printer 18 in step 88, with the specific dot region rendered in either the selected partial or mixed type dot.

Thus, a partial dot is rendered for text and halftone, since text and halftone are usually higher contrast in nature. This will not cause the Moire pattern in the halftone and will produce a smooth text boundary. The mixed dot, the best of the different dot types for continuous tone images, is rendered for the continuous tone region.

Collecting the statistical information and locally selecting the appropriate dot type from between a partial dot type and a mixed dot type provides superior reproduction of an image that contains different types of image regions, such as text, halftone and continuous tone regions.

The unified rendition method described above achieves many quality goals to render a mixed type document. However, there are some noise problems associated in the halftone printing due to its rendered weak dots in the halftone picture. To stabilize the rendered dots in the halftone picture, a different screen structure is necessary to impose on the original halftone screen. However, this enhances the Moire pattern in the halftone picture. A compromise between the noise issues and the Moire pattern is necessary to minimize the problem in printing halftone pictures and other mixed types of images.

Figure 9:
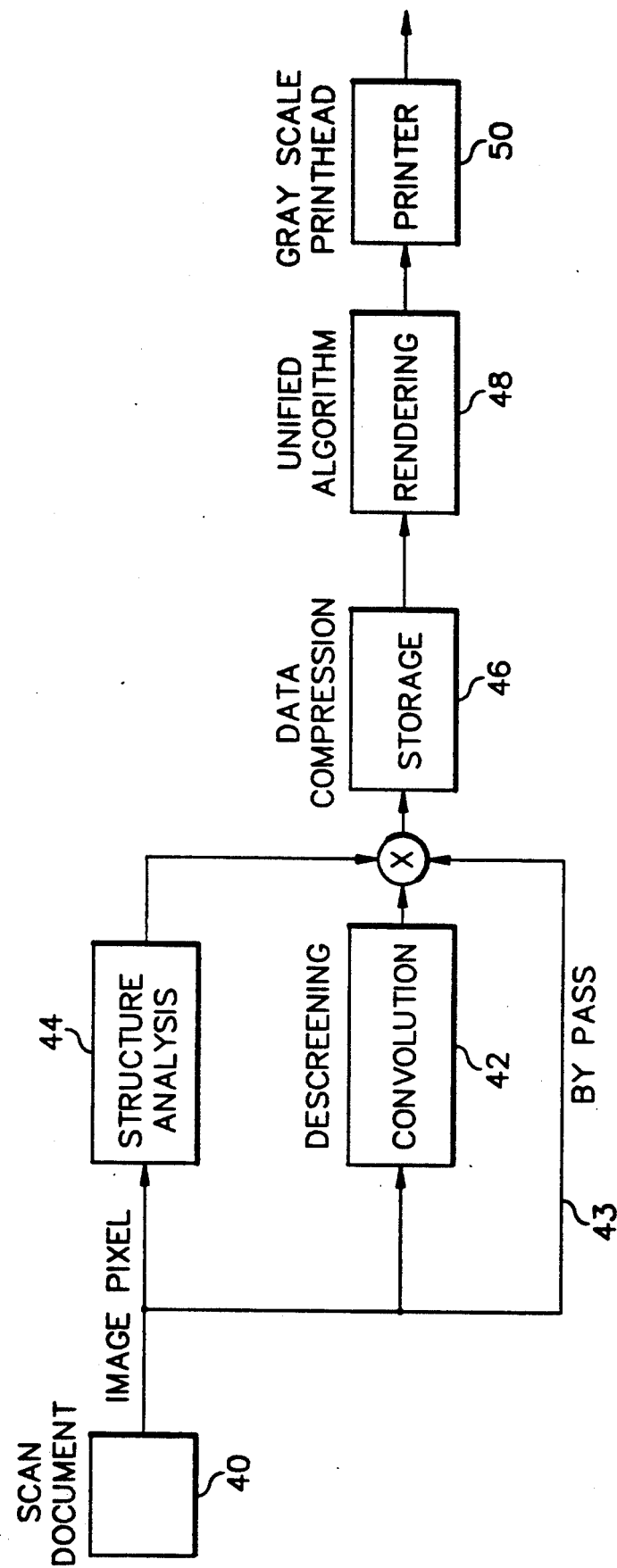
FIG. 9 shows a basic flow diagram of a method of the present invention.

The approach of the present invention, a basic flow diagram of which is illustrated in FIG. 9, further enhances the quality of the unified rendition method in dealing with a mixed type document. A document is scanned in step 40, and this scanned document is processed through a descreening filter in step 42 which removes only a certain frequency caused by the halftone screen. The descreening filter can be resident in the scanner 12 or the controller 16. The text blurring effects of this filter have been minimized for the specific designed filter characteristics.

A local structure analysis of the image is performed by the controller in step 44. The filter operation is applied selectively to the image region based on the results of this local structure analysis. The controller 16 will not alter those pixels along the text border (see bypass 43) while it filters those pixels in a low contrast region and in a halftone dot region. In this way, the text contrast is maintained and the noise and the halftone screen are smoothed out. The processed image is then stored (step 46) and rendered later through the unified method (step 48) and printed (step 50).

Figure 10:
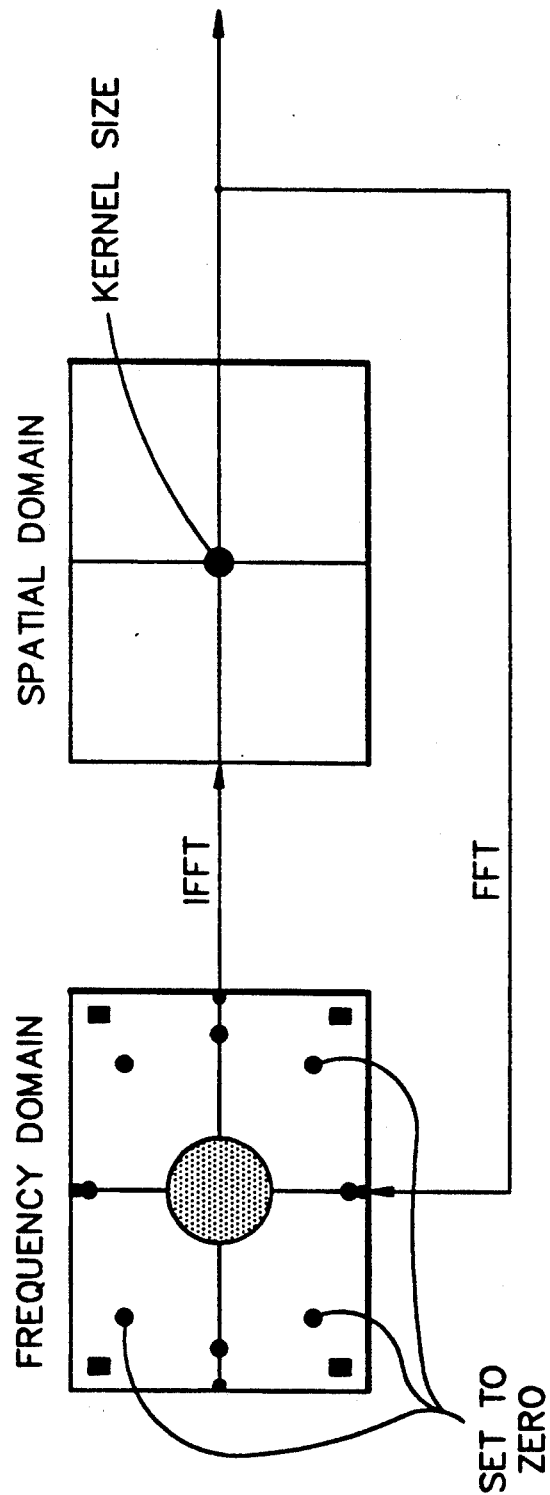
FIG. 10 shows the design of the descreening filter of the present invention.

The design of the filter will now be described with reference to FIG. 10. First, a frequency spectrum is selected in which the frequency response needs to be achieved. For example, in the present invention, it is desired to boost a certain frequency region while smoothing out another frequency region in the 256×256 size spectrum because of the scanner modulation transfer function which needs to be corrected in this manner. This frequency spectrum has a real number representation instead of a conventional complex number (a real part and an imaginary part) representation.

Second, the filter modifies the frequency strength around some frequency spots of the desired frequency spectrum to a minimum (i.e., approaching zero response) in a continuous but sharp slope change. These frequency spots are the locations of the halftone screen frequency. Other frequencies will not be altered.

Third, this modified frequency spectrum is then applied to an inverse FFT (Fast Fourier Transform) back to the spatial domain where image processing is operated. It has now a complex number representation in the spatial domain. An mxn window near the center (i.e., low frequency response region) of the real part of the spatial spectrum is cropped out. This window size is the designed filter size, for example a 5×5 filter kernel size. Due to this window cropping operation, certain regions in the spatial domain were excluded, in other words, coefficients are set to zero outside of the window. This cropping will modify some of the response shape in the desired frequency spectrum. Hence several feedback loops between the second step and the third step of previous described method are performed to enforce the strength of the screen frequency to be removed to the minimum. A final mxn window in the spatial domain is then chosen as the kernel of the descreening filter. This filter, when operated on the image, will then remove the specific frequency generated by the halftone screens. However, this filtering operation will also smooth out some contrast of text (the blurring effects) to a certain extent.

In the image descreening operation (step 42 of FIG. 9), the filter is convolved with image pixels to produce a result. During the convolution operation, a structure analysis in the current window (for example, 5×5 sizes) is taken to make a decision whether it will convolve the image pixels or not. The original pixel is output instead of the convolved result if there is a text structure in the operated window. Hence, some regions with text structures are maintained in the original pixel values while other regions with halftone structures are convolved with a descreening filter.

The present invention makes a determination that a region is halftone or text, or is low or high contrast. Both text and halftone structure are high contrast, but their local structures are different. For example, text as normally presented has a high contrast transition across its border. One side has a high pixel value while the other side (in vertical direction or in horizontal direction) has a low pixel value. If the pixel value difference from one side to the other side is greater than a certain threshold, it is determined to be a high contrast window. Otherwise, it is determined to be a low contrast window. If there is a consistent transition in the high contrast window such that one side has high values while the other side has low values, it is assumed that a text structure is in this window. If there is no consistent transition in the window and it causes a saddle point in the window, a halftone structure is assumed. This classification strategy based on the image structure makes about 95%–98% of correct decisions on text. Only a few percentage errors are made which is due to a small font of text whose body has a similar size to the window. In this situation, the structure may not be clearly defined. However, this small percentage error does not cause a problem of blurring in the normal size of text. Hence, an original image can be reproduced so as to maintain its text contrast in the text region while its screen structure is smoothed out in the halftone region and some noise is filtered out in the low contrast region.

Figure 11:
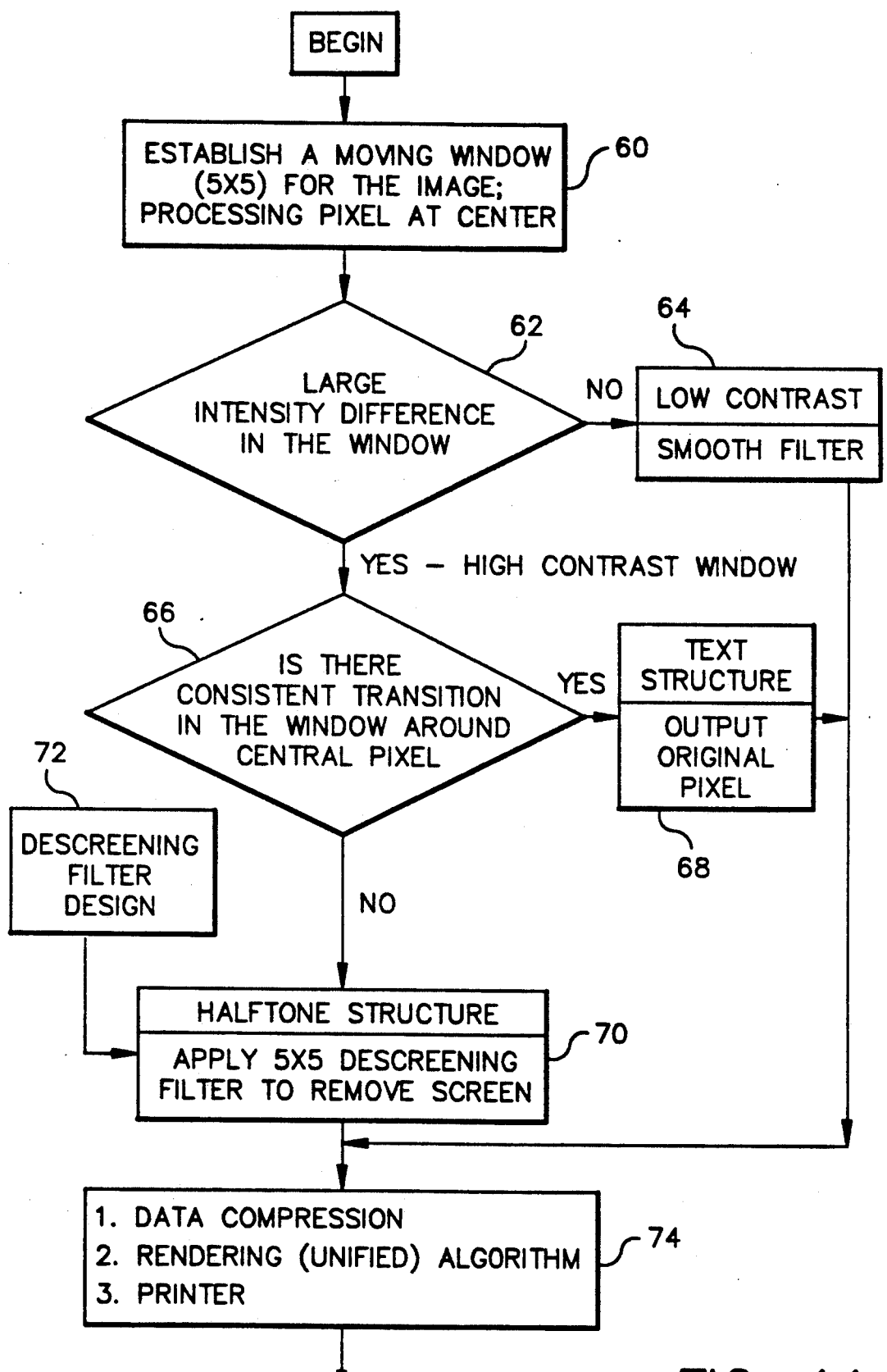
FIG. 11 is a flow chart of an embodiment of the method of the present invention.

FIG. 11 shows a more detailed flow chart of the process of an embodiment of the present invention. In step 60, a moving window (such as a 5×5 window) is established for the image, with the pixel being processed at the center of this image. In step 62, it is determined whether there is a large intensity difference in the window. If there is not a large intensity difference, then the windowed region is a low contrast region, so that a smoothing filter operation to remove noise is applied in step 64, and these filtered pixels are provided to step 74 to be stored (compressed), rendered, and printed. A simple smooth filter that can be used is a weighted average operated with 3×3 or 5×5 window size.

When a large intensity difference is detected in step 62, the window is determined to be a high contrast window. The consistency of the transition within the window around the central pixel is then evaluated in step 66. If there is a consistent transition, then the window is considered to contain text structure and the original pixel is provided as an output in step 68.

When there is not a consistent transition in the window around the central pixel, the structure in the window is considered to be halftone structure, and the 5×5 descreening filter is applied to remove the screen in step 70. Briefly stated again, in the filtering operation, the image is transformed into the Fourier domain and then some specific frequency content (such as 133, 150, or 200 line screens) are removed. This modified Fourier image spectrum is then transformed back to the spatial image domain to complete the removal of the halftone screen. After being descreened, the image pixels are provided to step 74 for final processing.

The design of the descreening filter can be performed "on-line" as indicated by step 72, or it can be already provided. However, this is computationally slow, and it is preferred to operate the filter design off-line and only perform convolution in the halftone window structures on-line.

Although the invention has been described and illustrated in detail, it is to be clearly understood that the same is by way of illustration and example, and is not to be taken by way of limitation. The spirit and scope of the present invention are to be limited only by

What is claimed:

1. An arrangement for reproducing an original image, comprising:
    scanner means which scans and digitizes the original image;
    controller means coupled to the scanner means to receive the digitized original image, perform a local structure analysis of the digitized original image, selectively apply a descreening filter to a region of the digitized original image based on the results of the local structure analysis to remove a specific frequency of the digitized image caused by halftone screens, allow a bypass of the descreening filter of other regions of the digitized image such that bypassed regions remain unfiltered by said descreening filter, and which produces a first signal representing filtered regions and unfiltered regions, said first signal corresponding of the digitized original image;
    a printer coupled to the controller to receive said first signal and which produces a gray level halftoned production of the original image; and
    wherein the descreening filter includes means for transforming the digitized image into a frequency domain, means for reducing the specific frequency content from the digitized image, and means for transforming the digitized image back into the spatial image domain and feedback means between the spatial domain and the frequency domain to iteratively reduce to a minimum the specific frequency in the digitized image.

2. A method of reproducing an original image, comprising:
    scanning an original image to produce a digitized image;
    performing a local structure analysis of the digitized image;
    selectively applying a descreening filter to a region of the digitized image based on the results of the local structure analysis to remove a specific frequency of the digitized image caused by halftone screens;
    bypassing the descreening filter with regions of the digitized image such that said bypassed regions remain unfiltered by said descreening filter;
    printing said filtered regions and said bypassed regions as a single, unified reproduction of the original image; and
    wherein the step of performing the local structure analysis includes the steps of;
    establishing a moving window for the digitized image around a central pixel;
    determining if the moving window is a low contrast window or a high contrast window;
    determining if there is a consistent transition in the moving window around the central pixel; and
    causing the application of the descreening filter to the moving window when the moving window is a high contrast window and there is not consistent transition in the moving window around the central pixel.

3. The method of claim 2, wherein the step of determining if the moving window includes detecting the intensity difference in the moving window, with a large intensity difference indicating a high contrast window and a small intensity difference indicating a low contrast window.

4. The method of claim 2, further comprising smooth filtering a moving window determined to be a low contrast window.

5. The method of claim 4, wherein the bypassed regions have been determined to be a moving window that is a high contrast window with a consistent transition in the moving window around the central pixel.

6. The method of claim 2 and including rendering regions processed by the descreening filter with a partial dot growth structure.

7. The method of claim 6 and including rendering bypassed regions with a mixed dot growth structure.

8. A method of reproducing an original image, comprising:
    scanning an original image to produce a digitized image;
    performing a local structure analysis of the digitized image;
    selectively applying a descreening filter to a region of the digitized image based on the results of the local structure analysis to remove a specific frequency of the digitized image caused by halftone screens;
    bypassing the descreening filter with regions of the digitized image such that bypassed regions remain unfiltered by said descreening filter;
    printing filtered regions and bypassed regions as a single, unified reproduction of the original image; and
    wherein in the descreening filter the image is transformed to a frequency spectrum and a certain frequency is reduced and the modified image transformed into the spatial domain, and there is feedback between the spatial domain and the frequency domain to iteratively reduce to a minimum the certain screen frequency.

9. The method of claim 8 and including rendering regions processed by the descreening filter with a partial dot growth structure.

10. The method of claim 9 and including rendering bypassed regions with a mixed dot growth structure. the terms of the appended claims.

* * * * *